United States Patent Office 3,342,162
Patented Sept. 19, 1967

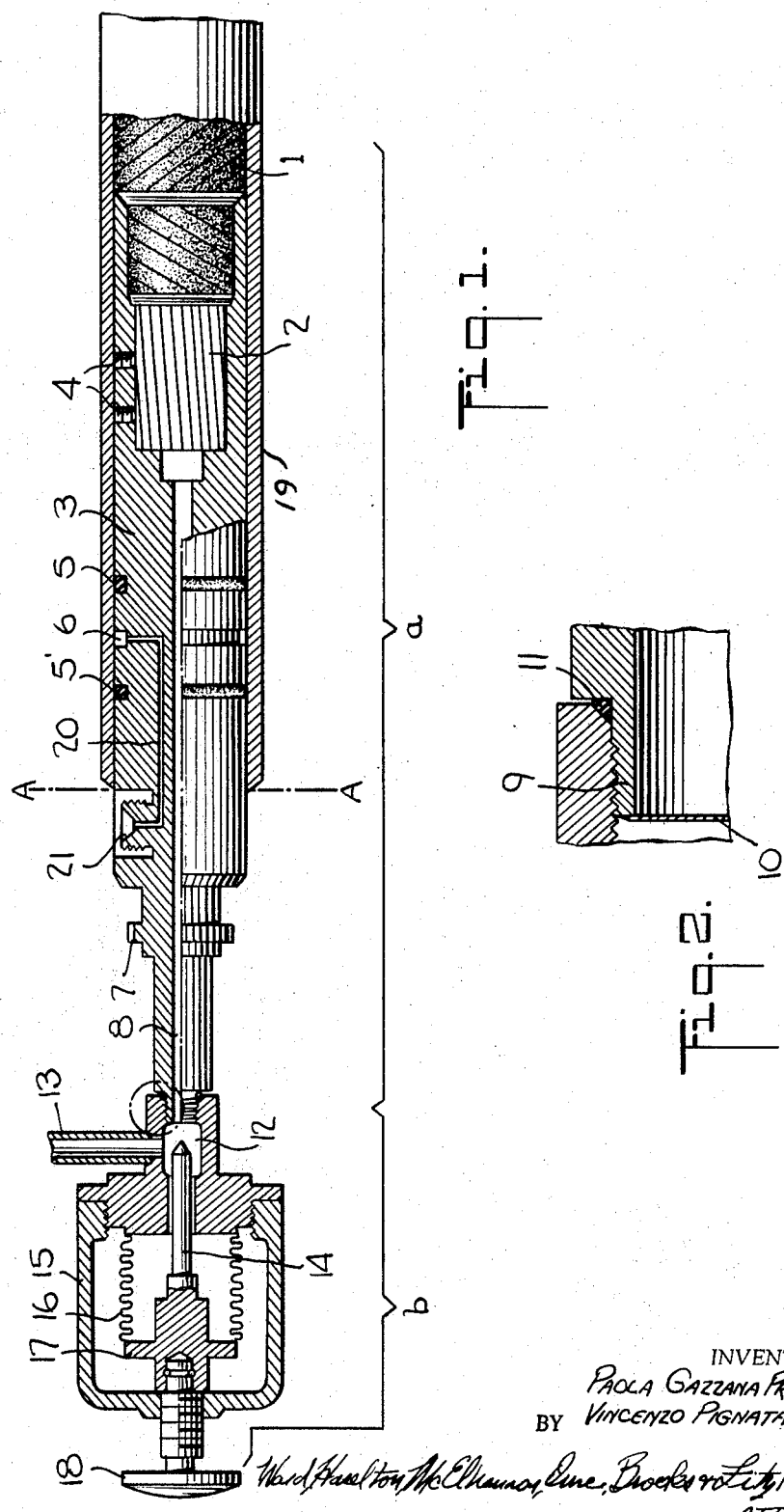

3,342,162
SELF-SEALING END CAPS FOR THE IMPREGNATION OF SHEATHED ELECTRIC CABLES OF THE OIL-FILLED TYPE
Paolo Gazzana Priaroggia, Milan, and Vincenzo Pignataro, Livorno, Italy, assignors to Pirelli Società per Azioni, Centro Pirelli, Milan, Italy, a corporation of Italy
Filed July 28, 1964, Ser. No. 385,724
Claims priority, application Italy, Aug. 2, 1963, 16,070/63
3 Claims. (Cl. 118—50)

ABSTRACT OF THE DISCLOSURE

Cable end caps for use in preparing oil-filled electrical cables and comprising a sleeve mechanically secured to a cable core and adaptable to be hermetically sealed to the outer sheath of the cable, a duct extending through the sleeve and sealed at one end with a lamina, a cap like part securable to the outer end of the sleeve and having means for piercing the lamina.

---

This invention relates generally to an improved self-sealing end cap for use on sheathed cables which are to be impregnated with an insulating fluid, and more particularly to a self-sealing end cap which includes a terminal cock attached thereto in order to establish communication with the inner ducts of the sheathed cable.

There is an ever growing demand today for sheathed cables which are impregnated with an insulating fluid. One known method for providing such a cable is to dry and evacuate the core of a cable, which is covered with insulated paper tape or other insulating material, in a heated tank which is under a high vacuum. The thus treated core is then sheathed with an impervious metallic sheath, generally made of lead or aluminum, the sheathing being carried out under the same vacuum conditions existing in the tank during the drying and evacuation operation. After the metallic sheath has been applied to the core, the core, while still subjected to the same vacuum, is impregnated with a fluid having a high dielectric property. The impregnation is carried out by providing a liquid communication with both ends of the cable and injecting the impregnating liquid at one end of the cable, while at the other end of the cable a suction action is created, such, for example, as by means of a suitable vacuum pump, in order to ensure proper distribution of the impregnating liquid throughout the length of the cable core.

To carry out this process, it is necessary to maintain the core under the same conditions that existed in the tank during drying and evacuation while the core is being sheathed with the impervious metallic sheath and also during the interval while one end of the cable is being connected to the vacuum pump and the other end of the cable is being connected to the source of insulating fluid in order to carry out the impregnation.

Self-sealing end caps, capable of ensuring fluid tightness by virtue of the high pressure with which the metallic sheath is applied to the end cap, are known. The use, however, of these types of end caps has been restricted to sheathing cables which have already been impregnated. These types of end caps, therefore, have proven unusable where it is desired to effect the connection of the vacuum pumps and the impregnating fluid source with the inside of the cable without modifying the environmental conditions existing in the cable during drying an evacuation.

In order to permit the impregnation of the sheathed core while under a vacuum, suitable self-sealing end caps provided with valves have been employed. Since the transverse dimension of the valves, however, must not be greater than the outside dimension of the cable core, these end caps become quite complicated and are very difficult to handle.

Another solution consists of sealing off both ends of the metallic sheath enclosing the core, by employing a squeezing machine positioned downstream of the press. In order to impregnate the cable with the insulating fluid, the sealed ends of the sheathed cable are provided with suitable impregnating hoods, the impregnating hoods being provided with connections to the vacuum pump and to the source of impregnating fluid.

The impregnating hoods are also provided with a tool, which is utilized to perforate the metallic sheath in order to establish liquid communication with the core inside of the sheath. The impregnating operation is carried out when the vacuum conditions existing inside of the sheathed cable are equalled inside of the impregnating hoods and also inside of the tubes connecting the impregnating hood with the vacuum pumps and with the source of impregnating liquid. The reason for this was to ensure that the environmental conditions existing inside of the cable were not modified. As it can be seen, this process was quite intricate and difficult to accomplish.

In the method just described, it is necessary that the metallic sheath be perforated in order to effect communication between the impregnating hood and the cable to be impregnated. In order to obtain a satisfactory result, it is necessary to leave a hollow space between the core end and the inner surface of the squeezed metallic sheath, in order to ensure communication with the cable ducts. In this method, however, the breaking of the sheath by means of a lance is not sufficiently reliable and does not produce good results.

In view of the foregoing, the primary object of the present invention is to provide a self-sealing end cap which allows communication to be readily made with the cable core when desired.

Another object of the present invention is to provide a self-sealing end cap for use on sheathed electric cables which are to be impregnated, having a metallic lamina which can be readily perforated when it is desired to establish communication with the cable core.

Another object of the present invention is a terminal cock for use with the end cap.

A further object of the present invention is to provide a terminal cock comprising means for forming with the puncturable lamina of the end cap a vacuum-tight chamber having a connection for a vacuum pump and/or a source of impregnating oil, a lance movable within the chamber to perforate the puncturable lamina and means for so moving the lance.

These and further objects of the invention will appear from the following detailed description of the invention to be read in conjunction with the accompanying drawings in which similar parts of the several views are identified by the same reference numeral.

In the drawings:

FIGURE 1 is a cross-section of the self-sealing end cap of the present invention including a terminal cock, and FIGURE 2 is a cross-section of a detail of FIGURE 1 magnified for purposes of illustration.

Briefly stated the self-sealing end cap of the present invention is adapted to be used with cables which have been insulated with insulated paper tape or other insulating material and then dried and evacuated in suitable tanks under a high vacuum. The insulated cables are then sheathed with an impervious metallic sheath under the same environmental conditions existing in the tank during drying and evacuation. After sheathing, the cable is impregnated while still in the vacuum environment with a suitable insulating fluid.

The self-sealing end cap is provided with a duct which communicates with the inner ducts of the cable, the outlet of the duct in the self-sealing end cap being closed with a metallic lamina, which is tightly secured to the sleeve forming the end cap. After the metallic sheath has been applied to the cable, and in order to establish communication between the cable and the vacuum pumps, a terminal cock is tightly connected to the end of the self-sealing end cap. The terminal cock is provided with a lateral connection and with a lance for perforating the metallic lamina under the same vacuum and environmental conditions that exist inside of the cable.

Referring now to the drawings and particularly to FIGURE 1, reference letter $a$ represents the self-sealing end cap of the present invention, and the reference letter $b$ represents the terminal cock which is connected to and is part of the end cap $a$. The terminal cock $b$ as hereinafter described is provided with elements which function to perforate a lamina and with lateral connections for interconnection to a vacuum pump and to an oil tank.

The self-sealing end cap $a$ is adapted to be interconnected with a cable core 1, the core 1 being covered with insulation made of tape, paper or other insulating material. In preparing the cable 1 to receive the self-sealing end cap $a$, the insulation at the end of the cable 1 is removed to expose the conductor 2, and the insulation adjacent the exposed conductor 2 is partially removed in order to allow the axial introduction of a metallic sleeve 3 which has an outer diameter equal to the diameter of the cable core 1. The sleeve 3 is recessed in order to provide a suitable casing for the conductor 2. In assembling the self-sealing end cap to the cable core 1, the conductor 2 is inserted in the recess in the sleeve 3 and the sleeve 3 is fastened to the core 1 by any well-known means, such, for example, as by the screws 4. When the cable 1 contains a plurality of conductors 2, the sleeve 3 is provided with a number of recesses equal to the number of conductors. In the case of a plurality of conductors, each recess holding a conductor is provided with fastenings means in order to firmly attach the sleeve 3 to the core 1.

In order to improve the hermetic seal between the metallic sleeve 3 and the sheath 19, the periphery of the sleeve 3 is provided with recesses adapted to receive packing rings 5 and 5'. The purpose of the packing rings 5 and 5' is to locally increase the pressure of the sheath 19 on the yieldable elements it surrounds in order to improve the hermetic seal. In this manner, the hermetic seal is ensured, even if the end cap $a$ is slightly displaced with respect to the sheath 19.

The self-sealing end cap $a$ is provided with an axial main duct 8 for carrying the impregnating fluid to the core 1. In order to ensure that the core 1 is subjected to only the desired environmental conditions, a guard ring is located between the packing rings 5 and 5'. The guard ring consists of an annular groove 6 which is formed on the periphery of the sleeve 3. This groove 6 communicates with a vacuum pump (not shown) through a duct 20, which is formed interiorly of the sleeve 3 parallel to the main duct 8. In this manner, any air leakage which occurs between the packing ring 5' and the metallic sheath 19, starting from the position marked A—A is prevented by means of the vacuum pump functioning through duct 20 and the guard ring 6 from progressing beyond the guard ring 6. In this manner, it is assured that leakage beyond the guard ring 6 into the cable core 1 is prevented.

A portion of the self-sealing end cap $a$, which is not covered by the sheath 19, is provided with a threaded ring 7. The function of the ring 7 is to enable a pulling rope (not shown) to be attached to the end cap $a$, in order to draw the core 1 out of the impregnating tank and to drive the core 1 through a press for the application to the core 1 of the sheath 19 and in order to wind the core 1 on a bobbin.

As illustrated in FIGURE 1, the portion of the end cap located exteriorly of the sheath 19, is progressively reduced in diameter. At the reduced diameter extremity of the end cap $a$, a metallic lamina 10 is tightly fastened to the end of the sleeve 3 in such manner as to seal the end of the duct 8. The lamina 10, which may, for example, be made of copper, is preferably secured to the sleeve 3 by soldering and preferably by tin soldering. This detail is illustrated in FIGURE 2. The reduced diameter end of the sleeve 3, which is identified by the numeral 9, is threaded in order to allow interconnection with the terminal cock $b$.

In operation the end caps $a$, which are very simple and easy to handle, and which have formed therewith the metallic lamina 10, are connected to the two exposed ends of the core 1, in the manner described, before the introduction of the core 1 into the impregnating tank. In this manner, the end cap $a$ is subjected to all of the operations to which the core 1 is subjected. In this manner, during the drying and evacuating operations, there is no direct communication between the interior ducts of the core 1 and the tank. Since the core 1, however, is not covered with the sheath 19 during the drying and evacuating operation, the interior of the core 1 is subjected to drying and evacuating radially through the thickness of the insulation surrounding the core 1.

Following the drying and evacuation, the dried and evacuated core 1 with the end caps $a$ connected to the ends thereof, is passed through a press for the application to the core 1 of the impervious metallic sheath 19. The step of impregnation is carried out after the drying and evacuation and after the metallic sheath 19 has been attached to the core 1.

Following the drying and evacuation and the application of the sheath 19 to the core 1, the terminal cock $b$ is attached to the tapered ends 9 of the end cap $a$ by means of the threaded engagement described. In order to ensure a tight seal between the terminal cock $b$ and the end cap $a$, a packing ring 11 is positioned between the ends of the terminal cock $b$ and the end cap $a$. During the process of interconnecting the terminal cock $b$ with the end cap $a$, the packing ring 11 is compressed between the end walls of the terminal cock $b$ and the end cap $a$.

The terminal cock $b$ is provided with a laterally extending standard 13, which is adapted to interconnect with a chamber 12 interiorly of the terminal cock $b$ for a purpose to be described. The purpose of the standard 13 is to interconnect one terminal cock $b$ with a vacuum pump and the other terminal cock $b$ with a source of impregnating fluid.

The terminal cock $b$ is formed interiorly with a chamber 12, which is adjacent the metallic lamina 10 on the end of the self-sealing cap $a$ when the terminal cock $b$ is interconnected with the end cap $a$. The walls of the chamber $a$ serve to support a movable lance 14, which is axially aligned with the lamina 10. The casing 15 of the terminal cock $b$ has movably positioned therein a metallic lung 16 having undulated walls to allow compression and expansion of the metallic lung 16. As can be seen from FIGURE 1, one end of the lance 14 is supported by the walls of the chamber 12 and the other end of the lance 14 is connected to the base 17 of the metallic lung 16. The purpose of the metallic lug 16 is to allow maximum movement of the lance 14 within the casing 15 and also to ensure a seal between the chamber 12 and the interior of the casing 15. The movement of the lance 14 is controlled by the displacement of the base 17. As can be seen from FIGURE 1, the base 17 is interconnected to a hand wheel 18, such that rotation of the hand wheel 18 axially moves the base 17 and accordingly the lance 14 inwardly with respect to the stationary cock $b$.

In order to impregnate the cable 1, a source of vacuum is connected to the standard 13 on the cock $b$ until the desired vacuum is created in the chamber 12. When this desired vacuum is created in the chamber 12, the hand wheel 18 is rotated until the tapered lance 14 penetrates the metallic lamina 10 on the end of the end cap $a$. Once the lamina 10 is perforated, the lance 14 is returned to its initial position and the opening created by the breaking of the lamina interconnects the chamber 12 with the main duct 8. This operation is simultaneously carried on on the terminal cock and end caps secured to both ends of the cable core 1. While a source of vacuum is interconnected to one standard 13, the standard on the other end of the cable core 1 is interconnected to a source of impregnating liquid. Due to this difference in pressure, impregnating oil is drawn throughout the cable core 1.

When the cable 1 is completely impregnated, one of the two end cocks $b$ is initially removed and the end cap $a$ from which the terminal cock $b$ has been removed is interconnected to a tank containing impregnating oil in order to maintain the oil pressure in the cable 1. When this has been done the other terminal cock is removed and the second end cap is tightly closed.

What has been described is an improved self-sealing end cap. It is to be noted that although a preferred form of the invention has been described, changes and modifications may be made thereto without departing from the scope of the present invention except as limited by the appended claims.

We claim:

1. A self-sealing end cap for attachment to the end of a cable to be impregnated with insulating fluid after being dried and evacuated in a tank under vacuum and sheathed with an impervious metallic sheath, said self-sealing end cap being suitable to maintain the cable before, during and after such operation under the same environmental conditions existing in the tank, said end cap being constituted by a first sleeve like part, means for mechanically securing the interior of one end of said sleeve like part to the end of a cable core passing thereinto, means for hermetically sealing the exterior of said one end of said sleeve like part to the interior of one end of an impervious outer cable sheath, said sleeve like part further being formed with a duct extending thereto from its said one end to its other end, said duct being sealed at the other end of said sleeve like part by means of a metallic lamina, and a second, cap like part, constructed to be hermetically connected to said other end of said first sleeve like part after sheathing of said cable, a terminal part mounted on said second cap like part, said terminal part being connected to actuate a lance within said second cap like part to perforate said metallic lamina and to establish communication between the sleeve duct and a connection on said second cap like part arranged to connect the duct selectively with a vacuum source and with a source of insulating fluid.

2. A self-sealing end cap for cables to be impregnated under sheath with dielectric fluids as in claim 1, wherein said means for hermetically securing the exterior of said one end of said sleeve like part to the interior of one end of an impervious outer cable sheath comprises at least two packing rings and, between them, with at least a guard ring communicating with a vacuum pump by means of a suitable duct.

3. A self-sealing end cap for cables to be impregnated under sheath with dielectric fluids as in claim 1, wherein the tightness and the movement of the lance of the terminal part are ensured by means of a cylindrical undulated metallic lung.

References Cited

UNITED STATES PATENTS

| | | | |
|---|---|---|---|
| 1,118,649 | 11/1914 | Halter | 137—68 |
| 1,485,913 | 3/1924 | Gottlieb | 137—68 |
| 1,671,368 | 5/1928 | Johann | 137—68 X |
| 2,525,662 | 10/1950 | Freeman | 18—16 |
| 3,092,286 | 6/1963 | Duff | 137—68 X |
| 3,144,035 | 8/1964 | Gablanian et al. | 277—59 X |

MORRIS KAPLAN, *Primary Examiner.*